United States Patent [19]

Haacker et al.

[11] Patent Number: 4,711,297

[45] Date of Patent: Dec. 8, 1987

[54] ROTARY TUBE COOLER CONSTRUCTION

[75] Inventors: Heinz Haacker, Kreuztal-Ferndorf; Helmut Wensing, Essen, both of Fed. Rep. of Germany

[73] Assignee: MAN Gutehoffnungshutte GmbH, Fed. Rep. of Germany

[21] Appl. No.: 913,745

[22] Filed: Sep. 30, 1986

[30] Foreign Application Priority Data

Oct. 1, 1985 [DE] Fed. Rep. of Germany ....... 3534991

[51] Int. Cl.[4] ............................................. F28D 11/08
[52] U.S. Cl. ...................................... 165/88; 165/169; 432/83
[58] Field of Search ................... 165/88, 169; 432/83

[56] References Cited

U.S. PATENT DOCUMENTS

| 231,861 | 8/1880 | Spotford | 165/88 |
|---|---|---|---|
| 3,580,331 | 5/1971 | Wango | 432/83 X |
| 3,588,061 | 6/1971 | Sadovaya | 165/88 X |
| 3,805,406 | 4/1974 | Castonoli | 165/88 X |
| 3,918,893 | 11/1975 | Whitaker | 165/169 X |

FOREIGN PATENT DOCUMENTS

| 432970 | 10/1924 | Fed. Rep. of Germany | 165/169 |
|---|---|---|---|
| 419728 | 4/1947 | Italy | 165/169 |

Primary Examiner—Albert W. Davis, Jr.
Assistant Examiner—Richard R. Cole
Attorney, Agent, or Firm—McGlew and Tuttle

[57] ABSTRACT

In a rotary tube cooler for indirect cooling of pulverized to granular material with a revolving drum, the drum shell of the rotary tube cooler is formed of a tube system through which a liquid cooling medium is conducted. The tube system comprises either tubes meandering in longitudinal direction of the rotary tube cooler, or be formed of spiral tubes, or the combination of meandering and spiral tubes. The tubes are welded together. The feed of the cooling medium and the discharge of the heated cooling medium occurs via swivel joints. Connected downstream is a device for utilization of the waste heat of the rotary tube cooler.

10 Claims, 2 Drawing Figures

ROTARY TUBE COOLER CONSTRUCTION

FIELD AND BACKGROUND OF THE INVENTION

The invention relates in general to coking and in particular to a new and useful rotary tube cooler for indirect cooling of pulverized to granular material with a revolving drum.

The rotary tube cooler is to be suitable, inter alia, for the cooling of petroleum coke. Before further processing, the crude coke obtained in the coking of distillation residues is calcined, i.e. heated under exclusion of oxygen to as much as 1,400° C., whereby the proportion of volatile components is reduced and petroleum coke is formed.

The petroleum coke coming out of the calcining process must thereafter be cooled to the extent that it can be transported and bunkered, i.e. the petroleum coke temperature after cooling should be between 150° and 100° C.

For the cooling of petroleum coke, therefore, coolers are used. These are drums rotating in a waterbath. The rotor is mounted outside the waterbath, and for its drive an electric motor with gearing is provided. The water for cooling in the waterbath tank is cooled back via air coolers and is returned into the rotating cooler via circulating pumps.

SUMMARY OF THE INVENTION

The invention provides a rotatary tube cooler for indirect cooling of pulverized to granular material, for example petroleum coke, wherein the resulting waste heat can be utilized, i.e. where the heated cooling medium can be discharged and used, for example, for steam generation.

This problem is solved in that the drum shell of the rotary tube cooler is formed of a tube system through which liquid cooling medium is conducted. As cooling medium may be employed, e.g. water or oils. According to the invention, downstream of the rotary tube cooler a system for the utilization of the heated cooling medium is connected.

The drum shell of the rotary tube cooler is formed either by tubes meandering in the longitudinal direction of the cooler by spiral tubes. The meanders or spirals are welded together and form a jacket in tube-on-tube construction. The conduction of the cooling medium into and out of the cooling tubes occurs over swivel joints.

The pulverized to fine-grain material to be cooled is charged via a chute centrically into the rotary tube cooler and discharged at the opposite end via a discharge chute likewise arranged centrically.

If the rotary tube cooler is to be used for highly abrasive material, such as petroleum coke, the endangered areas such as chutes and the inner wall of the rotary tube cooler, may be provided with a coating which offers protection against abrasive wear.

A preferred form of realization for the cooling of petroleum coke provides that the first part of the rotary tube cooler comprises, as an evaporation part, a tube meandering in the longitudinal direction of the cooler. The cooling medium enters on the charging side of the cooler via a swivel joint and exits also on the charging side. The first part of the cooler is thus operated in co-directional and counter flow.

The second part of the drum shell is formed as a spiral tube. Here the cooling medium enters on the discharge side of the rotary tube cooler, flows in counter-current to the material to be cooled through the tube spiral, and leaves the spiral at the cooler end via a tube running centrally in the longitudinal direction of the cooler.

The heated cooling media from the two separate tube systems are subsequently supplied to a waste heat utilization system.

Accordingly, it is an object of the invention to provide a rotary heat transfer device which comprises a rotatable cylindrical drum having a wall with at least a portion being formed of adjacent tubes which form a continuous interior passage along the length of the drum.

A further object of the invention is to provide a rotary heat transfer drum which includes a wall made up of tubes arranged in close side by side fashion and defining a continuous flow channel, at least part of which is advantageously a meandering flow path and part of which is a spiral flow path.

A further object of the invention is to provide a rotary heat transfer drum which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
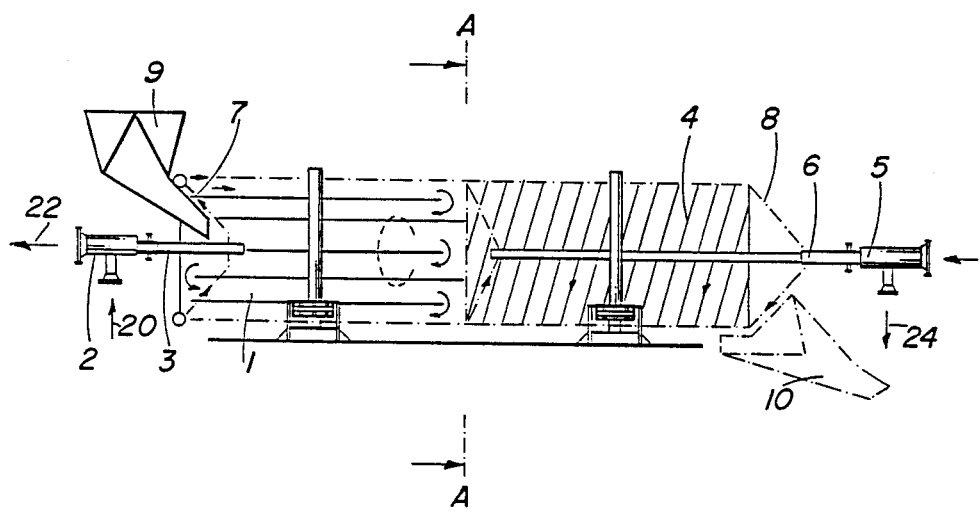
FIG. 1 is a schematic longitudinal section of rotary tube cooler constructed in accordance with the invention.
Figure 2:
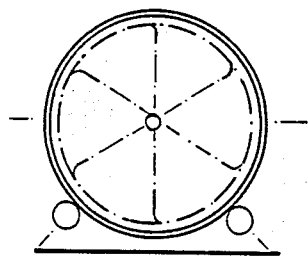
FIG. 2 is a transverse section along line A-A of FIG. 1.

Referring to the drawings in particular the invention embodied therein comrpises a rotary heat exchanger drum which is made up of wall having a continuous tube arranged with side by said passes which are continuous and extend in various flow patterns including a meandering tube or wall pattern 1 and a spiral tube wall pattern 4.

The longitudinal section of FIG. 1 of the drawings represents a rotary tube cooler comprising two separate cooling systems. The drum shell of the rotary tube cooler comprises a first part with meandering tubes 1. The meanders are welded together. Via a swivel joint 2 and a double walled tube 3 the cooling medium is introduced into the meander tube 1 in the direction of arrow 20. The first part of the rotary tube cooler is designed as evaporation section and is operated in co-directional and counter flow. The heated cooling medium, for instance water, leaves the meandering tubes 1 through the double-walled tube 3 and the swivel joint 2 in the direction of arrow 22 on the charging side of the rotary tube cooler, The second part of the rotary tube cooler is formed by a drum shell which is made of spiral tubes 4. The turns of the spiral tubes are welded together. The cooling medium passes through a swivel joint 5 and a double-walled tube 6 into the spiral tube 4 in arrow direction, and the heated medium leaves the cooler via the tube 6 extending in the center of the drum in the longitudinal direction of the drum and via the swivel joint 5 in the direction of the arrow 24 and reaches an installation (not shown) for waste heat utilization.

The drum shell of the rotary tube cooler formed of tubes 1 and 4 receives in the interior the material to be cooled. If this is a highly abrasive material as for instance petroleum coke, the walls of the cooling tubes are made correspondingly thick. On the other hand, it is possible also to provide the inner wall of the drum, which is formed of the cooling tubes 1 and 4, with a coating, e.g. by weld-plating.

While in the cooling of petroleum coke there is no danger, because of its good pourability, that the material to be cooled will settle in the furrows of the meanders or spirals, this might be the case with material which tends to cake. However, this is no problem because the material settling in the furrows in such a case constitutes on the other hand a wear protection for the tubes. Besides, if the accretions should cover the entire inner surface of the drum, the use of revolving scrapers or the like to remove accretions is well known.

The two end faces of the rotary tube cooler are also formed for the most part by the tubes 1 and 4. In the other part they consist of shell plate. The end faces 7 and 8 are annularly provided with central openings for the charging or discharging of the cooling material. By 9 is designed the charging chute and by 10 the discharging chute of the rotary tube cooler.

To improve the material transport inside the rotary tube cooler, the latter has a slight inclination toward the discharge end. It is for example 2°.

The drive of the rotary tube cooler for rotation of the drum around the central axis occurs in known manner, e.g. by an electric motor which drives a pinion, which in turn engages in a peripheral gear mounted on the outer wall of the drum.

In a form of realization (not shown) of the rotary tube cooler with a drum shell in the form of tubes meandering only in longitudinal direction of the cooler, or for a cooler whose drum shell is formed of spiral tube on the entire length, the description for the rotary tube cooler with a drum shell combined of meandering and spiral tubes applies analogousley.

With a corresponding design with meanders one can operate with a swivel joint for the coolant supply and discharge of the heated coolant, which swivel joint may be located either on the material feed side or on the draw-off side. Alternatively, of course, swivel joints may be arranged at both ends of the rotary tube cooler. In such a case one joint serves to feed the cooling medium and the other swivel joint on the opposite side of the cooler for discharging the heated medium.

The equivalent is true of the form of realization of the drum shell which is realized as a tube spiral over the full length. Here swivel joints for the cooling medium or for the heated cooling medium are necessary at both ends, if for the return of the heated cooling medium a tube disposed centrally inside the drum shell in longitudinal direction is to be dispensed with. A rotary tube cooler consisting of a spiral coolant tube as drum shell can be operated either in counter or in co-directional flow.

While specific embodiments of the invention have been shown and described in detail to illustrate the application of the principles of the invention, it will be understood that the invention may be embodied otherwise without departing from such principles.

What is claimed is:

1. A rotatable heat exchanger drum having a wall formed of a continuous tube arranged in a particular pattern defining a continuous flow path and includes a longitudinally extending tube portion at one end and a spirally extending tube portion at the other end.

2. A rotary tube cooler according to claim 1, wherein the continuous pattern includes a portion at which has a meandering pattern.

3. A rotary tube cooler according to claim 1, wherein said continuous pattern includes a portion wherein the tubes form a spiral path.

4. A rotary drum according to claim 1, wherein the tubes are arranged so that there is a fluid flow path within the tubes forming partial meandering pattern and a partial spiral pattern.

5. A rotary tube cooler according to claim 1, wherein said heat exchanger drum is mounted for rotation and includes tubes arranged in a longitudinal direction to form a meandering pattern which are welded together.

6. A heat exchanger drum according to claim 1, wherein said drum wall is formed of a spirally wound continuous tube which is welded together between successive windings.

7. A rotary heat exchanger drum comprising a wall formed of a continuously extending tube with successive portions arranged side by side and welded together with at least one portion being formed of tube portions which form meandering flow paths and a portion which forms a spiral flow path, one of said successive portions adjacent to one end leaving longitudinally extending tube portion and a spirally extending tube portion adjacent to the other end.

8. A heat exchanger drum according to claim 7, including means for feeding a cooling medium through the continuous tube, means mounting said drum for rotation and a swivel connection for the coolant discharge and for the coolant inlet.

9. A heat exchanger drum according to claim 8, including a system downstream of the continuously wound tube connected thereto for the utilization of the heated cooling medium.

10. A rotary heat exchange having a wall formed of a continuous uniterrupted tube made up of at least two separate tube systems including a first meandering system including a continuous tube which extends backwardly and forwardly without forming a coil and a second system in which there is uninterrupted helically extending tube formed into a series coils.

* * * * *